United States Patent
Anderson et al.

(10) Patent No.: US 12,393,729 B2
(45) Date of Patent: Aug. 19, 2025

(54) PRIVACY PRESERVING USER PERSONALIZATION USING NOISY RANKING

(71) Applicant: MICROSOFT TECHNOLOGY LICENSING, LLC, Redmond, WA (US)

(72) Inventors: Erik Daniel Anderson, Redmond, WA (US); Joseph J. Pfeiffer, III, Seattle, WA (US); Denis Xavier Charles, Redmond, WA (US); Aleksandr Rebrikov, Bellevue, WA (US); John Robert Mooring, Bellevue, WA (US); Brandon J. Maslen, Redmond, WA (US); Davis Leland Gilton, Seattle, WA (US); Sergey Yekhanin, Redmond, WA (US); Sivakanth Gopi, Skokie, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 215 days.

(21) Appl. No.: 18/301,943

(22) Filed: Apr. 17, 2023

(65) Prior Publication Data

US 2024/0346178 A1 Oct. 17, 2024

(51) Int. Cl.
*G06F 21/62* (2013.01)
*G06F 21/60* (2013.01)

(52) U.S. Cl.
CPC ........ *G06F 21/6254* (2013.01); *G06F 21/602* (2013.01)

(58) Field of Classification Search
CPC ............ G06F 21/6254; G06F 21/602
See application file for complete search history.

(56) References Cited

U.S. PATENT DOCUMENTS 9,002,975 B2    4/2015  Shenfield et al.
10,129,211 B2 * 11/2018 Heath ............... G06Q 30/02
(Continued)

FOREIGN PATENT DOCUMENTS

CN    114298734 A    4/2022
JP    2008539508 A   11/2008

OTHER PUBLICATIONS

Anders, Kelda, "Introduction", Retrieved From: https://github.com/WICG/privacy-preserving-ads/blob/main/NoisyRanking.md, Apr. 26, 2022, 25 Pages.

*Primary Examiner* — El Hadji M Sall
(74) *Attorney, Agent, or Firm* — David Foster; Newport IP, LLC

(57) ABSTRACT

Disclosed is a system that tracks website usage without compromising user privacy. The system aggregates website usage data of multiple users across multiple websites. Website usage data is aggregated in a way that preserves each individual user's privacy. Specifically, information relevant to a particular user may be obtained from the aggregated information without exposing what was actually collected from that user. In some configurations, user-specific website usage data is aggregated using trusted execution environment computing hardware. This ensures that privacy is preserved while user-specific data is transferred to and processed by the system. The trusted execution environment applies differential privacy techniques to ensure that use of the aggregated information does not reveal actual information about a user's website usage history. In this way, privacy is maintained while still enabling many of the scenarios that would otherwise rely on third-party cookies.

20 Claims, 6 Drawing Sheets

(56) References Cited

U.S. PATENT DOCUMENTS

| | | | |
|---|---|---|---|
| 10,636,056 B2 | 4/2020 | Chakraborty et al. | |
| 2002/0007453 A1* | 1/2002 | Nemovicher | H04L 63/105 |
| | | | 713/170 |
| 2013/0061035 A1* | 3/2013 | Hook | G06F 21/62 |
| | | | 713/150 |
| 2020/0089917 A1* | 3/2020 | Skourtis | G06F 21/76 |
| 2021/0217053 A1 | 7/2021 | Yu | |
| 2023/0043318 A1* | 2/2023 | Selman | G06F 21/6209 |

* cited by examiner

PRIVACY PRESERVING USER PERSONALIZATION USING NOISY RANKING

BACKGROUND

A cookie is a small piece of data stored on a user's device by a website. Cookies are created by web servers and sent to the user's browser where they store information such as preferences, login details, or items in a shopping cart. First party cookies originate from a website the user chose to visit. Third party cookies originate from a different domain than the website that the user chose to visit. For example, a news website from one domain may embed a weather forecast website from a different domain. Both the news website and the weather forecast website may download cookies onto the user's device. Cookies from the news website are considered first party because the user chose to navigate to the news website. Cookies from the weather website are considered third-party because they originated from a domain that the user did not explicitly choose to visit.

Third-party cookies are often used for tracking purposes, such as tracking a user's online behavior or serving targeted content. For example, a third-party analytics service may use third-party cookies to record which pages of a website a user has visited and how long they spent on each page. The website owner may use this information to improve the user experience or optimize the performance of the website.

Third-party cookies are also used to track a user across multiple domains, allowing the third-party to build a detailed profile of the user's online behavior and interests. This data can be used to improve the user's experience by providing content that is more relevant to the user's interests, and can also help to generate revenue for website owners. For example, a news website, an email website, and a social media website may all embed a web component from a third-party search provider. As the user browses these websites the third-party web component may store user interactions in a third-party cookie. The third-party cookie will also be accessible when the user visits the search provider's website directly. This gives the third-party visibility into the user's behavior while they were reading the news, checking their email, and browsing their social media feed.

One concern with third-party cookies is invasion of a user's privacy, as they allow the third-party to track a user's online activity without the user's explicit knowledge or consent. This is particularly worrisome when a third-party has an expansive reach, allowing it to track a significant percentage of a user's web browsing activity. In response to these privacy concerns, many web browsers now include options for blocking or restricting the use of third-party cookies. Unfortunately, while blocking third-party cookies protects a user's privacy, it also results in users receiving less relevant content suggestions, websites no longer having the insight provided by third-party analytics services, and the loss of other benefits enabled by third-party cookies.

It is with respect to these and other considerations that the disclosure made herein is presented.

SUMMARY

Disclosed is a system that delivers content without compromising user privacy. The system aggregates website usage data of multiple users across multiple websites. Website usage data is aggregated in a way that preserves each individual user's privacy. Specifically, information relevant to a particular user may be obtained from the aggregated information without exposing the granular identifying information that was collected from that user. In some configurations, user-specific website usage data is aggregated using trusted execution environment computing hardware. This ensures that privacy is preserved while user-specific data is transferred to and processed by the system. The trusted execution environment applies differential privacy techniques to ensure that use of the aggregated information does not reveal individually identifying information about a user's website usage history. In this way, privacy is maintained while still enabling many of the scenarios that would otherwise rely on third-party cookies.

Differential privacy allows data to be shared and analyzed in a way that provides strong privacy protections for individuals while still allowing meaningful insights to be drawn from website usage data. Differential privacy is a statistical method that obfuscates the output of a function that operates on user-specific data. The output is obfuscated such that it is impractical to determine if a given user record was present in the output data. Specifically, given two datasets, one including a specific user's data and another without, differential privacy ensures that with high probability it cannot be determined which dataset includes the specific user's data. For example, user-specific data that tracks views of cat videos is differentially private if it can't be determined whether a user's cat video viewing history is part of one of two different datasets. Useful information may still be derived from a differentially private function, such as the average number of cat videos viewed. While differential privacy is the most commonly discussed standard of privacy discussed herein, other privacy standards are similarly contemplated.

Differential privacy is transitive—a function applied to the output of a differentially private function is also differentially private. In this way, once differential privacy has been introduced into a sequence of processing steps, the results remain differentially private throughout the sequence. In order to protect user privacy of website usage information before it has been processed into a differentially private form, a trusted execution environment is employed.

A trusted execution environment uses encryption to ensure that website usage data is secure while it is aggregated and processed into a differentially private dataset. For example, a trusted execution environment may utilize a public/private key pair to ensure that user-specific website usage data is received securely from a web browser. In some configurations, the trusted execution environment is implemented by processors that are each assigned a private key. Website usage data may be encrypted with the corresponding public key before being transferred to the trusted execution environment. In this way, only code executing within the trusted execution environment is capable of accessing the user-specific website usage data.

The trusted execution environment may also use the processor-specific public/private key pair to attest to a third-party attestation service that it is running a specific piece of code and/or that the execution environment is in fact trusted. In this scenario, once the third-party attestation service has verified the trusted execution environment, the third-party attestation service provides a public/private key pair to the trusted execution environment for use encrypting website usage data. For example, the trusted execution environment may provide the public key obtained from the third-party attestation service to a client device so that the client device is able to encrypt website usage data before transmitting it to the trusted execution environment. Other TEEs may verify with the third-party attestation service that they are in fact trusted, e.g., that they are running secure software on secure hardware. These TEEs may be given the same public/private key pair, enabling them to further process data that was received previously by a different TEE.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Cookies are small text files that a website can place on a user's computer or mobile device. When the user visits the website again, the website can retrieve the cookie and use the information therein to remember the user's preferences, login information, browsing history, etc. For example, a website may use a cookie to store how long a user visited a particular page, what page the user visited next, etc. In the context of an advertising platform, the cookie may store indications of which ads were viewed, clicked on, or otherwise interacted with. In some configurations, the website may store a user identifier in the cookie while other user-specific information is stored on the server. Then on subsequent visits the website may retrieve the identifier from the cookie and use it to retrieve the user-specific information from the server.

As discussed above, third-party cookies raise privacy concerns. One concern is that by tracking user activity across a number of websites, a single entity is able to obtain a significant amount of information about an individual user. Information collected by an entity in this way is only as private as the security of the entity's systems and the willingness of the entity to protect the user's privacy.

For example, an advertising platform may use third-party cookies to track website usage patterns across websites. This allows sensitive information to be obtained about identifiable users. A breach of the advertising service's systems may result in user data being released to the public. Malicious entities could leverage this data to solicit users or even blackmail them.

Figure 1:
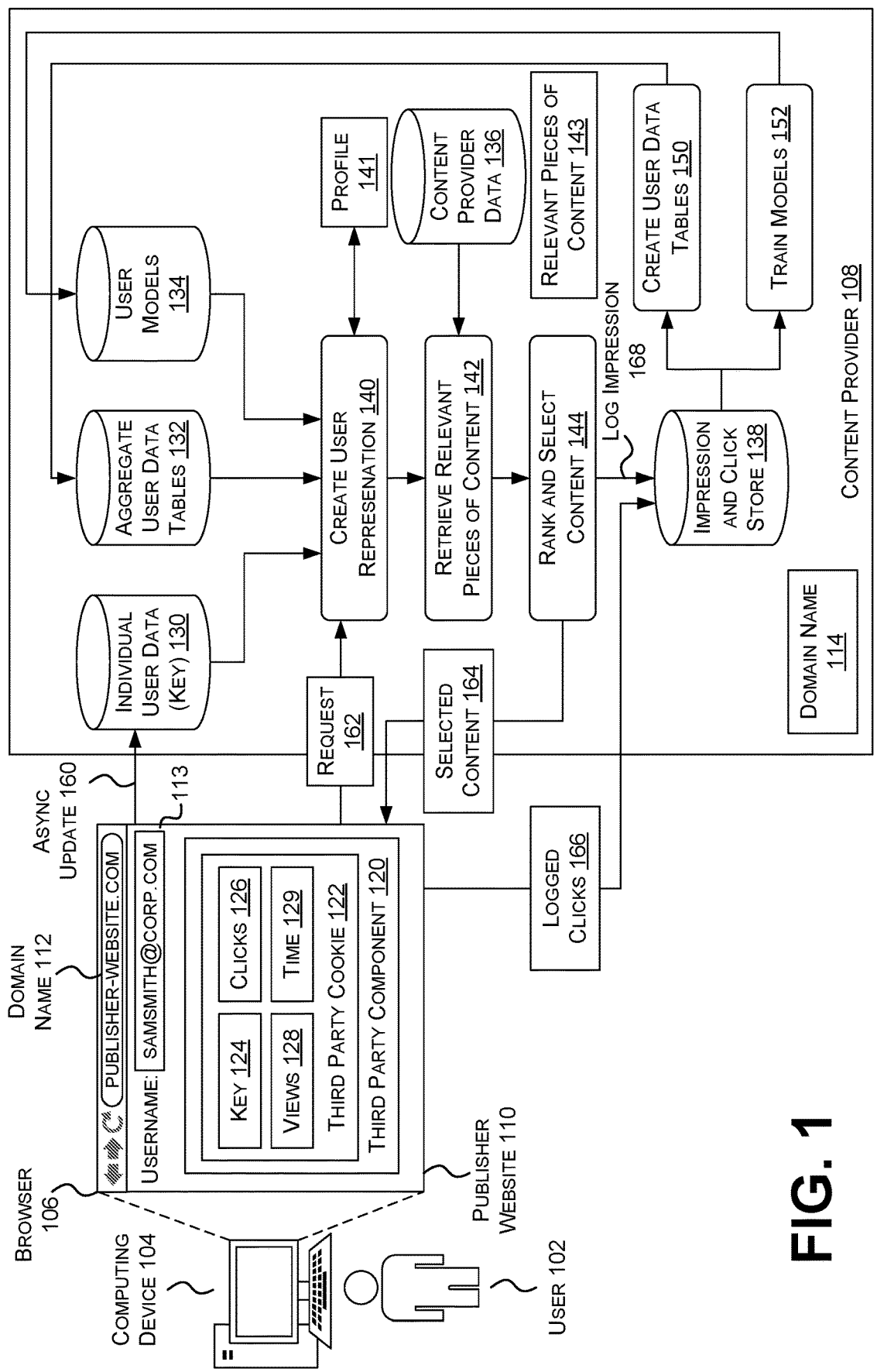
FIG. 1 illustrates using third-party cookies to serve targeted content to a user.

FIG. 1 illustrates how third-party cookies may be used to serve targeted content to a user. Targeted content refers to the practice of tailoring and delivering specific information, advertisements, or recommendations to users based on their personal data, preferences, or online behavior. The aim is to provide users with content that is more relevant, engaging, and likely to generate a positive response, such as clicking on an ad or purchasing a product. Serving targeted content, such as news articles, videos, or advertisements, etc., is one example of a technique that leverages information gathered with third-party cookies.

As illustrated, user 102 operates computing device 104, navigating browser 106 to publisher website 110. Publisher website 110 has domain name 112, which is part of a uniform resource locator (URL). Browser 106 may implement a same-origin policy, a security feature that restricts how documents and scripts from one domain can interact with resources from another domain. Unless special permission is granted by the user, this constrains website 110 to interacting with cookies that originated from domain name 112. User 102 has provided username 113, such as when logging into website 110.

Website 110 includes third-party component 120. Third-party component 120 may be an embedded website, a web component, a web application, a JavaScript library, or any other type of web content provided by content provider 108. Third-party component 120 has domain name 114 associated with content provider 108. When third-party cookies are enabled in browser 106, third-party component 120 is enabled to store data in and read data from third-party cookie 122 because they are both associated with the same domain name 114. Third-party cookie 122 may also be used to store the user-specific data that has been gathered from browser 106. For example, clicks 126, views 128, and time spent 129 are examples of the types of data that may be stored in third-party cookies, and are described in additional detail below. Such user-specific data may be used by content provider 108 to refine and provide targeted content.

Views 128 are indications of views of a website or a portion of a website such as a news article or an ad. In some configurations, a view is recorded if a website or a portion of a website is displayed by computing device 104. Views may also be identified based on eye tracking, monitoring mouse cursor position, or other more active techniques for determining if a piece of content has been viewed. Time 129 indicates how long a web page was viewed. Time 129 may refer to an amount of time that user 102 was actively using website 110, the amount of time that website was inactive but still displayed and/or open, or a combination thereof. Clicks 126 record user interactions with website 110 and web pages therein. For example, clicks 126 may include a history of mouse movements, mouse button clicks, mouse over events, mouse button click and holds, and the like. Logged clicks 166 represents the submission of clicks 126 to impression and click store 138.

In this example, key 124, which uniquely identifies user 102, is also stored in third-party cookie 122. Key 124 may have been provided by content provider 108 to track website usage of user 102 across multiple websites. Key 124 may be any type of unique identifier, such as a string of numbers, a username, a globally unique identifier, etc. Key 124 may be used when submitting user-specific data that has been gathered from browser 106. For example, async update 160 provides data stored in third-party cookie 122 to individual user data store 130. Key 124 may also be used when requesting content, e.g., as part of request 162.

Content provider 108 leverages a variety of data stores and machine learning models to process content requests 162. As illustrated, content provider 108 contains or is associated with individual user data store 130, aggregate user data tables 132, user models 134, content provider data 136, and impression and click store 138. Impression and click store 138 stores interactions with specific pieces of content that have been incorporated into a publisher's website.

In order to serve a piece of content in response to content request 162, content provider 108 may perform the steps of creating a user representation 140, retrieving relevant pieces of content 142, and ranking and selecting content 144. One or more pieces of selected content 164 are then returned to publisher website 110.

Individual user data store 130 is a cloud-hosted store of individualized user data obtained from third-party component 120, and which may have been stored for at least a period of time in third-party cookie 122. Individual user data store 130 may be associated with key 124, and as such contains potentially sensitive website usage information that can be tied to a particular user. Individual data store 130 tracks the websites that a user visits, as a way of building an understanding of user browsing habits.

Aggregate user data tables 132 represent user data that has been processed by content provider 108. The create user data tables operation 150 creates and/or updates aggregate user data tables 132 based in part on website usage data stored in individual user data store 130 and impression and click store 138. Aggregate user data tables 132 include information used to perform the create user representation operation 140.

User models 134 are machine learning models trained on website usage information. User models 134 are created by the train models operation 152 based in part on impressions and clicks stored in impression and click store 138. These models may be updated periodically, from every few minutes to every day or even longer periods of time. User models 134 may also be used to perform the create user representation operation 140.

Profile 141 is created by the create user representation operation 140. Profile 141 is a record of user 102 used to select targeted content, such as a targeted advertisement. User profile 141 may contain demographic information, website usage information, and/or attributes derived therefrom.

The retrieve relevant pieces of content operation 142 uses profile 141 to retrieve one or more pieces of content that are best suited to be presented to user 102. Content may be retrieved from content provider data 136. Content may be selected based on a number of factors, including a predicted likelihood of user 102 interacting with a piece of content, a profit or other value associated with displaying a particular piece of content, or the like. In the context of an advertising platform, a predicted conversion rate is one factor that may be used in selecting relevant pieces of content 143. Rank and select content operation 144 selects one or more of relevant pieces of content 143 to be returned to website 110 as selected content 164. In some configurations, rank and select content operation 144 performs an auction in which selected content 164 is selected from multiple competitive suppliers of content. This selection may be made according to budget, targeting, and campaign objectives of content providers, as well as the prices set by publishers.

Figure 2:
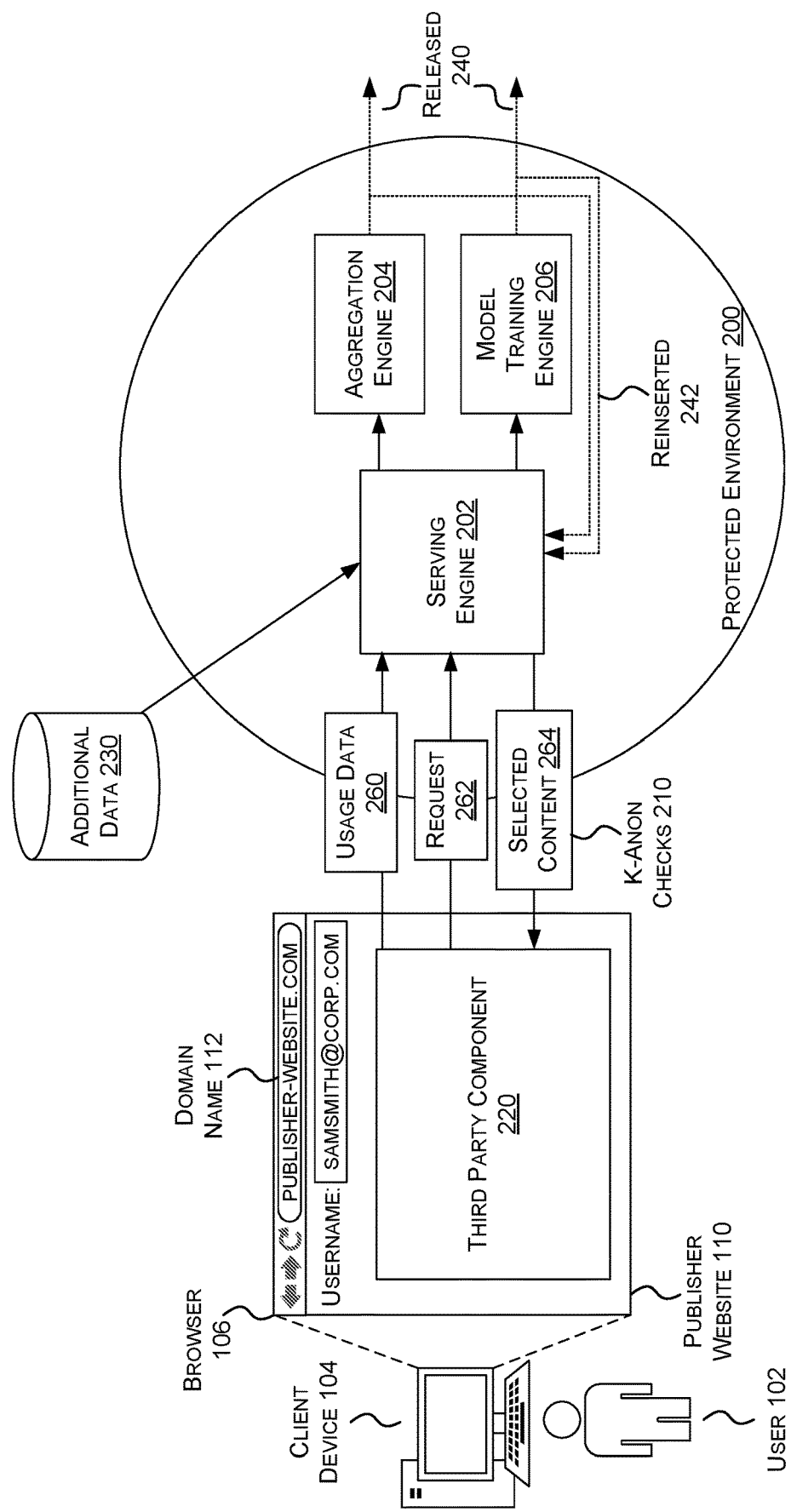
FIG. 2 illustrates an overview of a system for privacy preserving user personalization using noisy ranking.

FIG. 2 illustrates an overview of a system for privacy preserving content delivery using noisy ranking. FIG. 2 is a conceptual overview—more details are provided below in conjunction with FIG. 3. User 102, client device 104, browser 106, publisher website 110, and domain name 112 are as describe above in conjunction with FIG. 1, except that in FIG. 2 third-party cookies have been disabled by browser 106. Third-party component 220 is a component similar to component 120. For example, third-party component 220 may be a web component published by an advertising platform. Third-party component 220 may be embedded in publisher website 110 where it observes user behavior and displays advertisements.

Third-party component 220 sends user-specific website usage data 260 to serving engine 202, instead of tracking user 102 with third-party cookies 122 as in FIG. 1. This user-specific website usage data 260 may include sensitive, private information of user 102. Therefore, in the illustrated example, the user-specific website usage data 260 is protected by protected environment 200 until it can be processed into privacy-enhanced data tables, models, and other privacy-preserving forms.

Encryption is used to protect usage data 260 as it is transmitted from browser 106 to protected environment 200. Serving engine 202 contains hardware that ensures the privacy of web usage data 260 within protected environment 200. Specifically, serving engine 202 executes on trusted execution environment hardware. For example, serving engine 202 may execute on special hardware with a private key that makes it uniquely able to decrypt the encrypted usage data 260. The trusted execution environment may also include a hardware-based feature that attests that the code it is executing has been vetted by an independent third party. For example, the trusted execution environment may attest that it is running code that has been published as open source and that has been vetted by an independent security analyst that usage data 260 will not be released outside of the protected environment 200. The trusted execution environment may also use public/private keys to attest that the TEE is using agreed upon hardware and software.

In some configurations, instead of using the TEE's public/private key pair to encrypt usage data 260, a trusted third-party may use a different public/private key pair to encrypt usage data 260. Then, only after TEE has established that it running appropriately secure software and hardware will the trusted third-party provide the TEE with the key to decode usage data 260.

Aggregation engine 204 and/or model training engine 206 processes the website usage data 260 into low-dimensional embeddings. A low-dimensional embedding is a mathematical representation of high-dimensional data in a lower-dimensional space. It is a technique used in machine learning, data analysis, and visualization to simplify complex datasets and reveal patterns, relationships, or structures that may be difficult to discern in the original high-dimensional space. Specifically, high-dimensional website usage data 260 is converted into a lower-dimensional space. An ad-user relevance ranking can then be obtained by performing an inner product between the low-dimensional user embedding and ad embeddings. Ad embeddings with larger dot products are considered more relevant than ad embeddings with small dot products.

Low-dimensional user data may also be provided to aggregation engine 204. In order to protect the anonymity of the user, aggregation engine 204 may employ privacy-enhanced techniques such as differential privacy on the data it generates. For example, aggregation engine 204 may aggregate usage data 260 for user 102 with usage data from other users. This reduces the likelihood that someone could determine that usage data 260 from the particular user 102 was included in the aggregation. Noise—random changes to the data—may also be incorporated to prevent user 102 from being identified as part of the dataset. For example, values may be adjusted up or down at random at a rate that obscures whether a particular user's data was included in the aggregation. Noise may also be added by replacing values from usage data 260 with randomly generated values. In differential privacy, noise is typically generated from probability distributions like the Laplace distribution or the Gaussian distribution. The amount of noise added is determined by the sensitivity of the function being computed—the maximum difference in the output when a single record is added or removed from the dataset. Model training engine 206 may also train machine learning models that observe privacy-enhancing techniques such as differential privacy.

Differentially private data yielded by aggregation engine 204 and model training engine 206 may be reinserted 242 to serving engine 202 in order to serve targeted content while preserving user privacy. The differentially private data yielded by aggregation engine 204 and model training engine 206 may also be released 240 for use by components outside of protected environment 200. For example, a component outside the protected environment 200 that computes ad prices may utilize differentially private aggregations of website usage data and/or differentially private machine learning models trained on website usage data.

Serving engine 202 may also receive a request 262 for content, such as a request for an advertisement. Serving engine 202 may use differentially private data tables generated by aggregation engine 204 and/or differentially private machine learning models trained by model training engine 206 to select content. Serving engine 202 may use usage data 260 received from browser 106 with differentially private data tables and differentially private models to make this selection, e.g., by taking dot products of an embedding generated from usage data 260 and embeddings of the differentially private tables/models. Embeddings of the differentially private tables/models associated with the highest dot products are considered to be a better match for the usage data 260. Serving engine 202 may also consider additional data 230 when selecting content. Additional data 230 is not derived from third-party website usage data.

Figure 3:
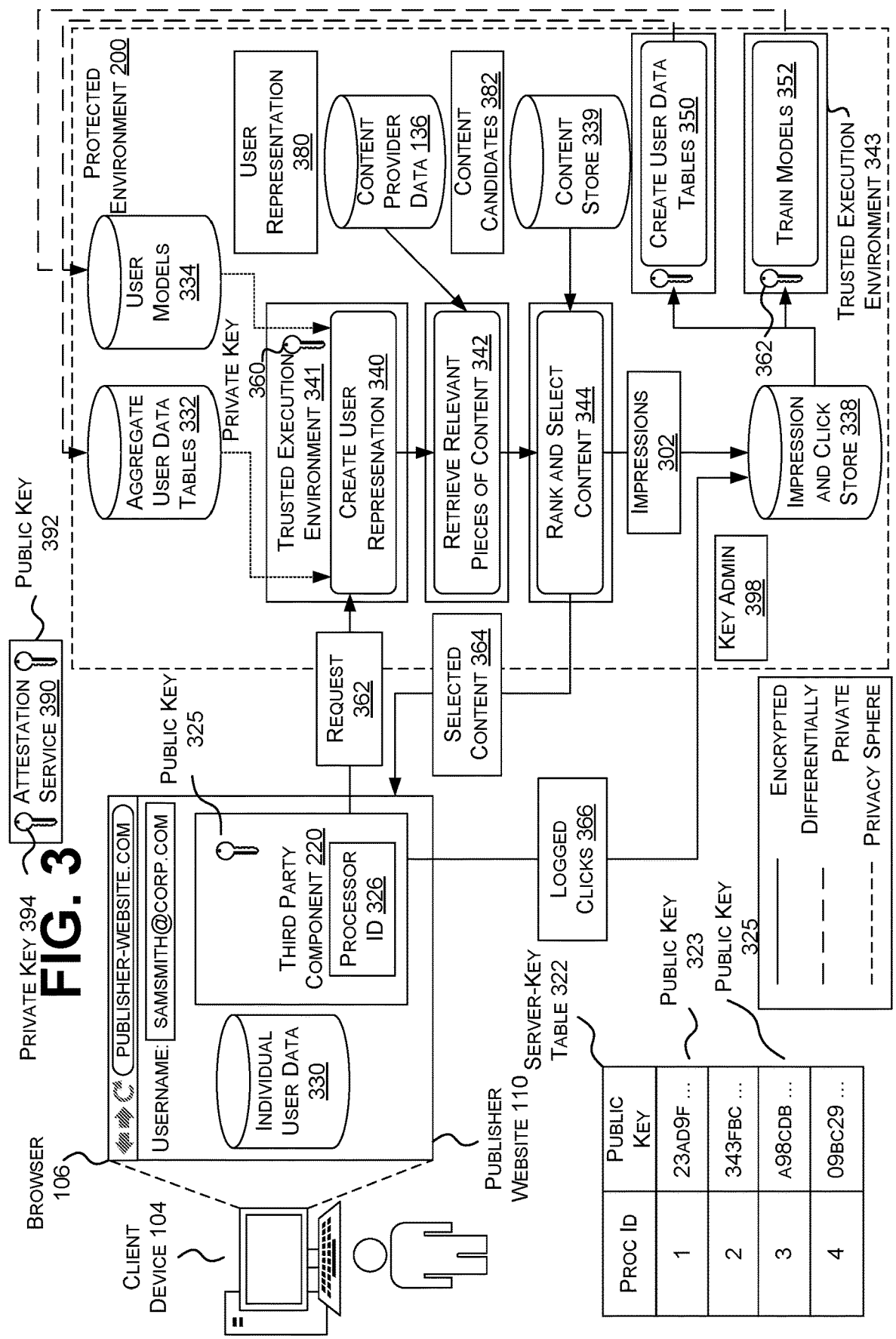
FIG. 3 illustrates a system for privacy preserving user personalization using noisy ranking.

FIG. 3 illustrates a system for privacy preserving content delivery using noisy ranking. FIG. 3 illustrates one example of an implementation of some of the concepts depicted in FIG. 2. User 102, client device 104, browser 106, and publisher website 110 are as described above in conjunction with FIGS. 1 and 2. In some configurations, individual user data store 330 stores user data locally, instead of on individual user data store 130 as in FIG. 1. This increases privacy, as user data is no longer vulnerable to leaks or hacks of individual user data store 130. Data stored in individual user data store 330 is encrypted and transmitted to a trusted execution environment within the protected environment 200 as part of content request 362. Furthermore, content request 362 and logged clicks 366 are encrypted using public key 325, which is selected based on the specific computing device that will receive the content request and logged clicks. In some configurations, content request and logged clicks are encrypted using public key 392, which may be obtained from trusted execution environment 341. TEE 341 may have obtained public key 392 from attestation service 390 after using private key 360 to attest that TEE 341 is in fact a trusted execution environment.

Create user representation operation 340, retrieve relevant pieces of content operation 342, rank and select content operation 344, create user data tables operation 350, and train models operation 352 may be implemented by one or more trusted execution environments (TEEs) such as trusted execution environment 341. A TEE is a secure area of a computer or mobile device that ensures sensitive data is processed securely. It is typically isolated from the main operating system and runs on a separate processor or core. The TEE provides a secure environment for cryptographic key storage, ensuring that keys are protected from malware and other forms of tampering.

Some trusted execution environments include processors manufactured with a private key that is stored internally, without any means for copying the key. In these embodiments, each processor is associated with a unique private key. The processor's manufacturer may delete all other copies of these private keys before releasing the processor to market, ensuring that data encrypted with the corresponding public keys may only be accessed by the appropriate processor.

The manufacturer of the trusted execution environment may also publish table 322 or other data source that lists processor identifiers and their corresponding public keys. Third-party component 220 may receive a processor ID 326 when connecting to content provider 108. For example, third-party component 220 may receive an indication that TEE 341 has processor ID 1. Third-party component 220 may also receive processor ID 326 when submitting usage data 260, when submitting request 262 or at any other time. Third party component 220 may use this processor ID to obtain public key 323 from server-key table 322. In some configurations, before sending request 362, logged clicks 366, or any other request to content provider 108, third-party component 220 may use this public key 323 to encrypt some or all of the request.

In other configurations, an attestation service 390 may independently verify that TEE 341 is running code that has been deemed secure by an independent party and/or that TEE 341 uses hardware to effectively protect usage data 260. Once attestation service 390 has established the veracity of TEE 341, attestation service 390 may transmit public key 392 and private key 394 to key administrator 398. Key administrator 398 may be within TEE 341 or separate from TEE 341, and key administrator 398 may be within or external to protected environment 200.

Key administrator 398 may provide third-party component 220 with public key 392. Third-party component 220 may use public key 392 to encrypt usage data 260 before transmitting it to TEE 341. TEE 341 may receive private key 394 from attestation service key administrator 398. TEE 341 may then use private key 394 to access usage data 260 that was encrypted with public key 392, enabling usage data 260 to be processed in secure environment 200.

TEE 341 may transmit a report to another TEE within secure environment 200. If the report is not differentially private then privacy may be maintained by encrypting the report with public key 392. The other TEE will need to repeat attestation with attestation service 390 in order to acquire private key 394 with which to decrypt the report. This technique may be used again with another TEE, enabling a sequence of TEEs to operate on usage data 260.

In some configurations, multiple attestation services 390 may be employed to provide multiple public/private key pairs. Usage data 260 may then be doubly encrypted, ensuring that privacy is maintained even if one of the key pairs is compromised. Additionally, in some configurations the Key Administrators 398 are separate entities from the attestation services 390, simply providing private keys to TEEs that attestation service 390 attests are properly configured and secure. Such configurations introduce more required points of failure before user privacy can be compromised.

These techniques and equivalent techniques protect potentially sensitive web usage data while it is transmitted from browser 106 to trusted execution environment 341 within the protected environment 200 of content provider 108.

Once request 362 is received by trusted execution environment 341, the create user representation operation 340 is performed, followed by the retrieve relevant pieces of content operation 342 and the rank and select content operation 344, after which selected content 364 is returned to third-party component 220 for display in browser 106. While create user representation operation 340, retrieve relevant pieces of content operation 342, and rank and select content operation 344 are illustrated in FIG. 3, these are simply examples of operations that may be applied to return selected content 364 in response to request 362. Other operations are similarly contemplated. Furthermore, while FIG. 3 illustrates one application of the disclosed privacy preserving user tracking techniques—selecting content—other applications such as web analytics are similarly contemplated.

Request 362 is decrypted by trusted execution environment 341 using the private key 360 that corresponds to the public key 323 listed for processor ID '1' in server-key table 322. Additionally, or alternatively, request 362 may be decrypted by TEE 341 using private key 394 obtained from the key administrator 398. Once decrypted, request 362 may be processed in order to return one or more appropriate pieces of content to third-party component 220. Request 362 may include, for example, web usage data from individual user data 330. This web usage data is potentially detailed and sensitive, but is confined to trusted execution environment 341.

As illustrated, each of processing steps 340, 342, and 344 are executed in a different trusted execution environment. In this scenario, communications between each trusted execution environment may be encrypted similar to how request 362 is encrypted. For example, the public key of the destination trusted execution environment may be obtained from server-key table 322 and used to encrypt the communication. For example, user representation 380, which may be derived from sensitive web usage data, may be encrypted when passing it from the create user representation operation 340 to the retrieve relevant pieces of content operation 342. In this way, even if they are obtained, communications within protected environment 200 remain unusable to unauthorized users. In another configuration, each TEE used to perform one of processing steps 340-344 may obtain public key 392 and private key 394, which originate from service 390, and each TEE may use these keys to encrypt and decrypt data sent between TEEs.

In some configurations, when training models 352 and/or aggregating user data tables 350, a differential privacy administrator ensures that differential privacy is maintained by enforcing constraints on how differentially private models 352 and/or data tables 350 are generated. The differential privacy administrator may be implemented by another trusted execution environment or a trusted third-party service. The differential privacy administrator receives or generates metadata about records used to train the models 352 and/or aggregate tables 350, such as a hash of a record. One example of a constraint uses the hash of the record to ensure that the record is only processed once, or some other defined number of times. This maintains differential privacy because differential privacy is not effective if an unrestricted amount of noise is added to models 352 and/or tables 350.

Create user representation operation 340, retrieve relevant pieces of content operation 342, and rank and select content operation 344 operate similar to operations 140, 142, and 144 described above in conjunction with FIG. 1, with the addition in FIG. 3 of the use of encryption to secure the privacy of user 102. One difference is that user data is no longer stored on a server device such as individual user data store 130 in FIG. 1, but is instead stored in individual user data 330 within browser 106. Another difference is that the information provided by aggregate user data tables 332 and user models 334 is differentially private. This means that potentially sensitive web usage data has been modified by the addition of noise to make it impracticable to determine whether a profile of a user was part of a particular data table or used to train a particular model.

Create user representation operation 340 may use individual user data 330 received from request 362 to create a representation 380 of user 102. This representation 380 may indicate, for example, that user 102 has viewed a large number of cat videos.

Retrieve relevant pieces of content operation 342 may utilize user representation 380 to obtain content from content provider data store 136. For example, retrieve relevant pieces of content operation 342 may obtain a list of videos, advertisements, or other content based on user representation 380. In some configurations, content candidates 382 are obtained by taking an inner product of an embedding of user representation 380 and embeddings of aggregate user data tables 332 and/or one or more of user models 334. Content may be selected to be provided to third-party component 220 based on a ranking of the inner products, with content that has a larger inner product being ranked higher than content with a lower inner product. In some configurations, retrieve relevant pieces of content operation 342 may perform a real-time differentially private request of aggregate user data tables 332, user models 334, or any other differentially private data store.

If rank and select content operation 344 operates in a different trusted execution environment, then content candidates 382 may be encrypted using the public key of the destination TEE. When a third-party attestation service 390 is used, then content candidates 382 may be encrypted with the public key 392 obtained from third-party attestation service 390. Rank and select content operation 344 then ranks, filters, and otherwise evaluates the content candidates 382. One or more of the top-ranked pieces of content are then obtained from content store 339. One or more of these pieces of content are then returned to third-party component 220 as selected content 364.

In some configurations, a k-anonymity check is applied to ensure that selected content 364 does not reveal a user's personal information or online behavior. K-anonymity is a property of datasets that aims to protect the privacy of individuals within the dataset by ensuring that each individual is indistinguishable from at least k−1 other individuals. This is achieved by generalizing or suppressing certain attributes (also known as quasi-identifiers) in the dataset to create groups of records that are indistinguishable from each other. By ensuring that selected content 364 adheres to k-anonymity standards, individual user data 330 may be used to select content while ensuring that individual users cannot be singled out and their privacy is maintained.

As illustrated, rank and select content operation 344 also produces impressions 302. While selected content 364 is returned to browser 106 for display, impressions 302 are used to further train user models 334 and update aggregate user data tables 332. Impressions 302 may include reference to or copies of selected content 364. In the case of an advertising platform, an impression indicates that user 102 has been presented with an advertisement. In some configurations, selected content 364 is considered an impression. Impressions 302 and logged clicks 366 are stored in impression and click store 338. In some configurations, impressions 302 and logged clicks 366 are encrypted when stored in impression and click store 338.

Create user data tables operation 350 queries impression and click store 338 to generate an aggregate user data table that is stored in aggregate user data tables 332. Create user data tables operation 350 generates tables that are differentially private. For example, noise—random fluctuations in values—may be introduced to obscure whether web usage data from user 102 is or is not in one of the generated tables. Typically, for tables with larger numbers of elements, less noise needs to be introduced to maintain differential privacy. Similarly, train models operation 352 uses data from impression and click store 338 to create a differentially private machine learning model stored in user models 334. These models may also be used to select content targeted to a particular user.

In FIG. 3, the larger dashed lines between stores and components indicate that data is differentially private. Solid lines indicate that the communication is encrypted. Shorter dashed lines indicate the boundary of protected environment 200. Since an operation performed on the output of a differentially private function is also differentially private, and create user data tables 350 and train models 352 introduce differentially private data into the system, downstream of these operations, the data the operations produced may be used outside of the protected environment without eroding user privacy.

The system depicted in FIG. 3 illustrates a loop—web usage data is securely gathered from browsers and used to generate data tables and models. These tables and models are used to select content. The content that is selected is an impression, which is stored in impression and click store 338, completing the loop. By ensuring that user data tables and models are differentially private, the incorporation of this data into subsequent iterations of the loop ensures user privacy.

Figure 4:
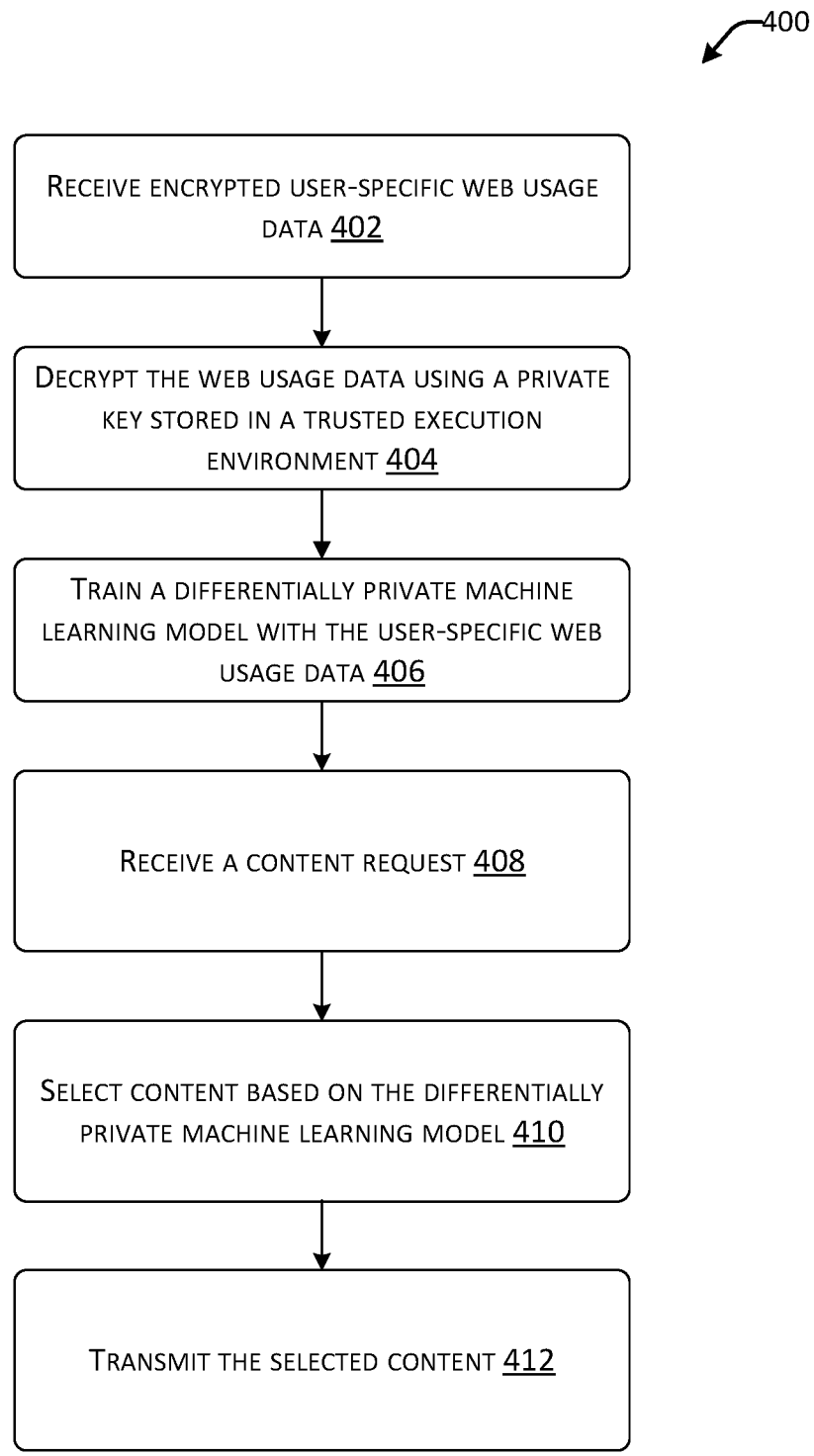
FIG. 4 is a flow diagram of an example method for privacy preserving user personalization using noisy ranking.

With reference to FIG. 4, routine 400 begins at operation 402, where encrypted, user-specific web usage data 366 is received by a trusted execution environment. In some configurations, the user-specific web usage data 366 has been encrypted with a public key 392 obtained from a third-party attestation service 390.

Next at operation 404, the web-usage data 366 is decrypted within protected environment 200 using private key 362 stored in trusted execution environment 343.

Next at operation 406, a differentially private machine learning model 334 is trained based on the user-specific web usage data 366.

Next at operation 408, a content request 362 is received from a third-party component 320 running on browser 106 of client device 104.

Next at operation 410, content 364 is selected based on the differentially private machine learning model 334.

Then, at operation 412, the selected content 364 is checked for k-anonymity before being returned to the third-party component 320.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
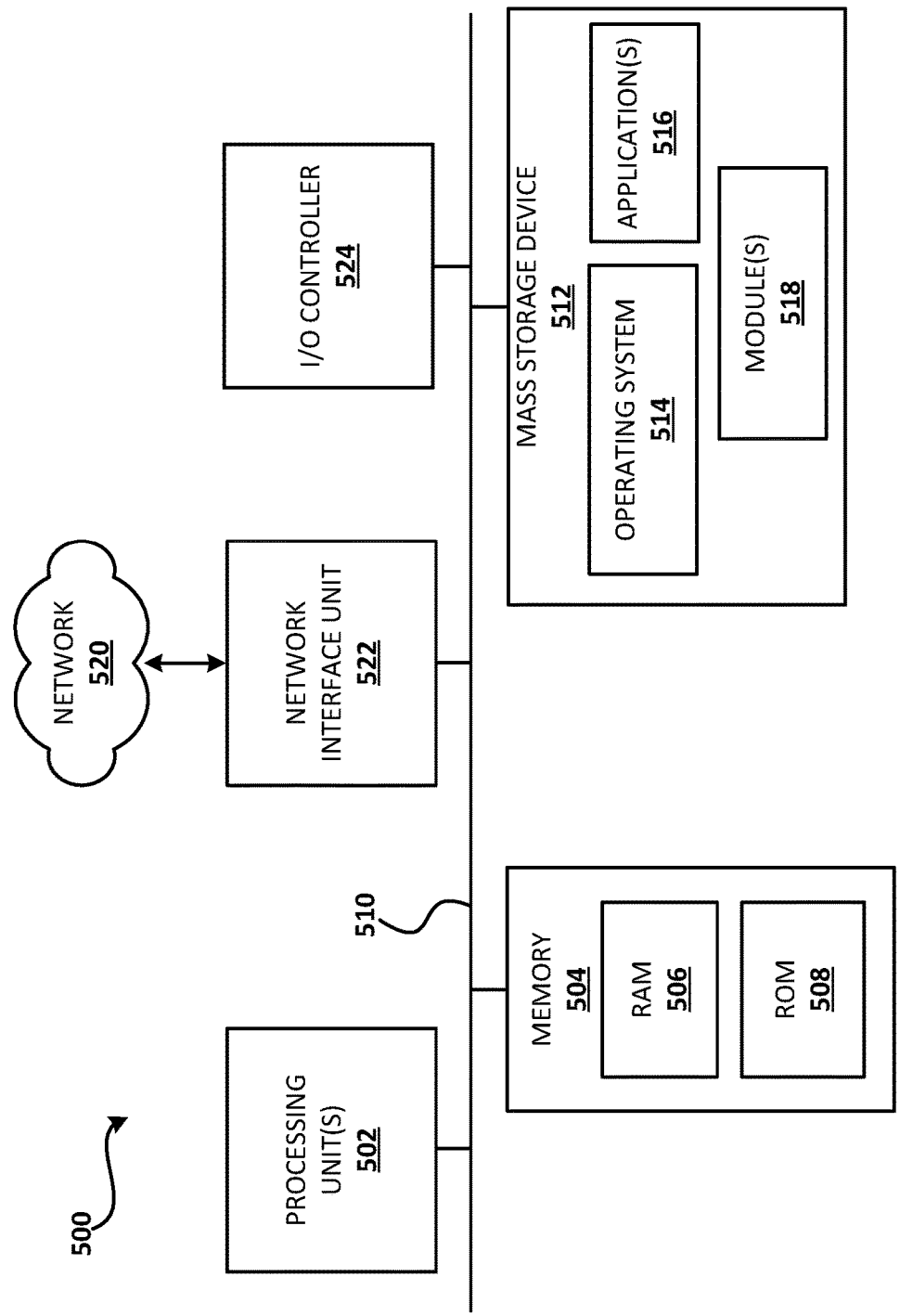
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
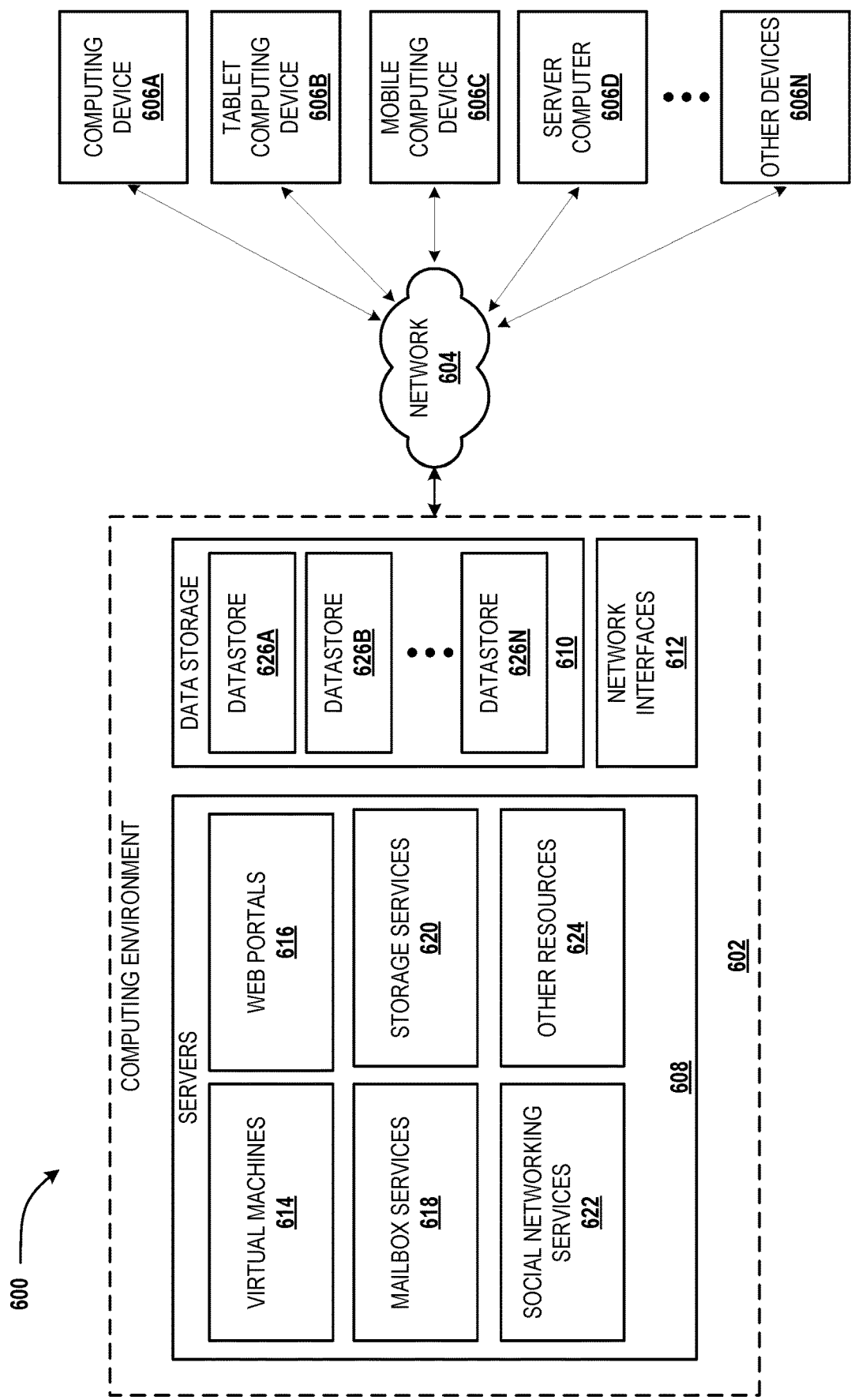
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The present disclosure is supplemented by the following example clauses:

Example 1: A method comprising: establishing, to a third-party attestation service (390), that the processing system (502) is a trusted execution environment; receiving a public key (392) and a corresponding private key (394) from the third-party attestation service (390); receiving user-specific web usage data (366) that has been encrypted with the public key (392); decrypting the user-specific web usage data (366) using the private key (394); storing the user-specific web usage data (366) in a differentially private data store (332); selecting content (364) to be displayed to a user (102) based on the differentially private data store (332); and transmitting the selected content (364) to a client computing device (104).

Example 2: The method of Example 1, wherein the differentially private data store comprises a differentially private machine learning model or a differentially private data table.

Example 3: The method of Example 2, further comprising: providing the differentially private machine learning model and the differentially private data table to an external service.

Example 4: The method of Example 2, further comprising: providing the differentially private machine learning model and the differentially private data table to an internal service that selects content for users; and deleting the non-differentially private user-specific web usage data.

Example 5: The method of Example 1, further comprising: performing a k-anonymity check on the content to be displayed to remove any identifying information within the content or within a reference to the content.

Example 6: The method of Example 1, further comprising: providing the client computing device with the public key received from the third-party attestation service.

Example 7: The method of Example 2, wherein a publicly disclosed program executing on the trusted execution environment trains the differentially private machine learning model.

Example 8: A computer-readable storage medium (504) having computer-executable instructions stored thereupon that, when executed by a processing system (502), cause the processing system (502) to: establish, to a third-party attestation service (390), that the processing system (502) is a trusted execution environment; receive a public key (392) and a corresponding private key (394) from the third-party attestation service (390); receive user-specific web usage data (366) generated by a user (102) and that has been encrypted with the public key (392); decrypt the user-specific web usage data (366) using the private key (394) of the trusted third-party attestation service (390); within the trusted execution environment (343), train a differentially private machine learning model (334) with the user-specific web usage data (366); receive a content request (362) from a client computing device (104); select content (364) to be displayed to the user (102) based on the differentially private machine learning model (334); encrypt the selected content (364); and transmit the encrypted selected content (364) to the client computing device (104) in response to the content request (362).

Example 9: The computer-readable storage medium of Example 8, wherein individual user data is stored on the client computing device before being processed by the trusted execution environment.

Example 10: The computer-readable storage medium of Example 8, wherein the content is selected from a content store that encrypts the content.

Example 11: The computer-readable storage medium of Example 8, wherein the trusted-execution environment establishes that the processing system is a trusted execution environment based on a private key that is permanently stored in the processor of the processing system.

Example 12: The computer-readable storage medium of Example 8, further comprising:

establishing an attested channel that is used to communicate the user-specific web usage data to the truest execution environment.

Example 13: The computer-readable storage medium of Example 8, wherein the trusted execution environment is one of a plurality of trusted execution environments, each having a unique public key/private key pair received from the trusted third-party attestation service, and wherein the plurality of trusted execution environments perform a plurality of operations that collectively select the content to be displayed to the user.

Example 14: The computer-readable storage medium of Example 13, wherein the plurality of trusted execution environments comprise a sequence of trusted execution environments, and wherein each of the sequence of trusted execution environments obtains a public key associated with a subsequent trusted execution environment with which to encrypt any data sent to the subsequent trusted execution environment.

Example 15: A processing system, comprising: a processor (502); and a computer-readable storage medium (504) having computer-executable instructions stored thereupon that, when executed by the processor (502), cause the processing system to: establish, to a third-party attestation service (390), that the processing system (502) is a trusted execution environment; receive a public key (392) and a corresponding private key (394) from the third-party attestation service (390); receive user-specific web usage data (366) generated by a user (102) and that has been encrypted with the public key (392) provided to the first trusted execution environment (343) of a plurality of trusted execution environments by the third-party attestation service (390); decrypt the user-specific web usage data (366) using the private key (394); within the first trusted execution environment (343) of the plurality of trusted execution environments, train a differentially private machine learning model (334) with the user-specific web usage data (366); receive a content request (362) from a client computing device (104); within a second trusted execution environment (341) of the plurality of trusted execution environments: select a piece of content (364) from a plurality of possibly relevant pieces of content (382) to be displayed to the user (102) based on the differentially private machine learning model (334); and transmit the selected content (364) to the client computing device (104) in response to the content request (362).

Example 16: The processing system of Example 15, wherein the differentially private machine learning model is trained in part based on the web usage data.

Example 17: The processing system of Example 15, wherein the user-specific web usage data comprises clicks of content or impressions of content.

Example 18: The processing system of Example 15, wherein the content request originates from an embedded website associated with the processing system.

Example 19: The processing system of Example 15, wherein the instructions further cause the processing system to: incorporate the user-specific web usage data into a differentially private dataset, wherein selecting the piece of content to be displayed to the user is additionally based on the differentially private dataset.

Example 20: The processing system of Example 19, wherein functions applied to the differentially private dataset or the differentially private machine learning model return results that are themselves differentially private.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   establishing, to a third-party attestation service, that a processing system is a trusted execution environment;
   receiving a public key and a corresponding private key from the third-party attestation service;
   receiving user-specific web usage data that has been encrypted with the public key;
   decrypting the user-specific web usage data using the private key;
   storing the user-specific web usage data in a differentially private data store;
   selecting content to be displayed to a user based on the differentially private data store; and
   transmitting the selected content to a client computing device.

2. The method of claim 1, wherein the differentially private data store comprises a differentially private machine learning model or a differentially private data table.

3. The method of claim 2, further comprising:
   providing the differentially private machine learning model or the differentially private data table to an external service.

4. The method of claim 2, further comprising:
   providing the differentially private machine learning model or the differentially private data table to an internal service that selects content for users; and
   deleting the non-differentially private user-specific web usage data.

5. The method of claim 1, further comprising:
   performing a k-anonymity check on the content to be displayed to remove any identifying information within the content or within a reference to the content.

6. The method of claim 1, further comprising:
   providing the client computing device with the public key received from the third-party attestation service.

7. The method of claim 2, wherein a publicly disclosed program executing on the trusted execution environment trains the differentially private machine learning model.

8. A computer-readable storage medium having computer-executable instructions stored thereupon that, when executed by a processing system, cause the processing system to:
- establish, to a third-party attestation service, that the processing system is a trusted execution environment;
- receive a public key and a corresponding private key from the third-party attestation service;
- receive user-specific web usage data generated by a user and that has been encrypted with the public key;
- decrypt the user-specific web usage data using the private key of the trusted third-party attestation service;
- within the trusted execution environment, train a differentially private machine learning model with the user-specific web usage data;
- receive a content request from a client computing device;
- select content to be displayed to the user based on the differentially private machine learning model;
- encrypt the selected content; and
- transmit the encrypted selected content to the client computing device in response to the content request.

9. The computer-readable storage medium of claim 8, wherein individual user data is stored on the client computing device before being processed by the trusted execution environment.

10. The computer-readable storage medium of claim 8, wherein the content is selected from a content store that encrypts the content.

11. The computer-readable storage medium of claim 8, wherein the trusted-execution environment establishes that the processing system is a trusted execution environment based on a private key that is permanently stored in the processor of the processing system.

12. The computer-readable storage medium of claim 8, further comprising:
- establishing an attested channel that is used to communicate the user-specific web usage data to the trusted execution environment.

13. The computer-readable storage medium of claim 8, wherein the trusted execution environment is one of a plurality of trusted execution environments, each having a unique public key/private key pair received from the trusted third-party attestation service, and wherein the plurality of trusted execution environments perform a plurality of operations that collectively select the content to be displayed to the user.

14. The computer-readable storage medium of claim 13, wherein the plurality of trusted execution environments comprise a sequence of trusted execution environments, and wherein each of the sequence of trusted execution environments obtains a public key associated with a subsequent trusted execution environment with which to encrypt any data sent to the subsequent trusted execution environment.

15. A processing system, comprising:
a processor; and
a computer-readable storage medium having computer-executable instructions stored thereupon that, when executed by the processor, cause the processing system to:
- establish, to a third-party attestation service, that the processing system is a first trusted execution environment of a plurality of trusted execution environments;
- receive a public key and a corresponding private key from the third-party attestation service;
- receive user-specific web usage data generated by a user and that has been encrypted with the public key provided to the first trusted execution environment of a plurality of trusted execution environments by the third-party attestation service;
- decrypt the user-specific web usage data using the private key;
- within the first trusted execution environment of the plurality of trusted execution environments, train a differentially private machine learning model with the user-specific web usage data;
- receive a content request from a client computing device;
- within a second trusted execution environment of the plurality of trusted execution environments:
  - select a piece of content from a plurality of possibly relevant pieces of content to be displayed to the user based on the differentially private machine learning model; and
  - transmit the selected content to the client computing device in response to the content request.

16. The processing system of claim 15, wherein the differentially private machine learning model is trained in part based on the web usage data.

17. The processing system of claim 15, wherein the user-specific web usage data comprises clicks of content or impressions of content.

18. The processing system of claim 15, wherein the content request originates from an embedded website associated with the processing system.

19. The processing system of claim 15, wherein the instructions further cause the processing system to:
- incorporate the user-specific web usage data into a differentially private dataset, wherein selecting the piece of content to be displayed to the user is additionally based on the differentially private dataset.

20. The processing system of claim 19, wherein functions applied to the differentially private dataset or the differentially private machine learning model return results that are themselves differentially private.

* * * * *